United States Patent Office 2,890,068
Patented June 9, 1959

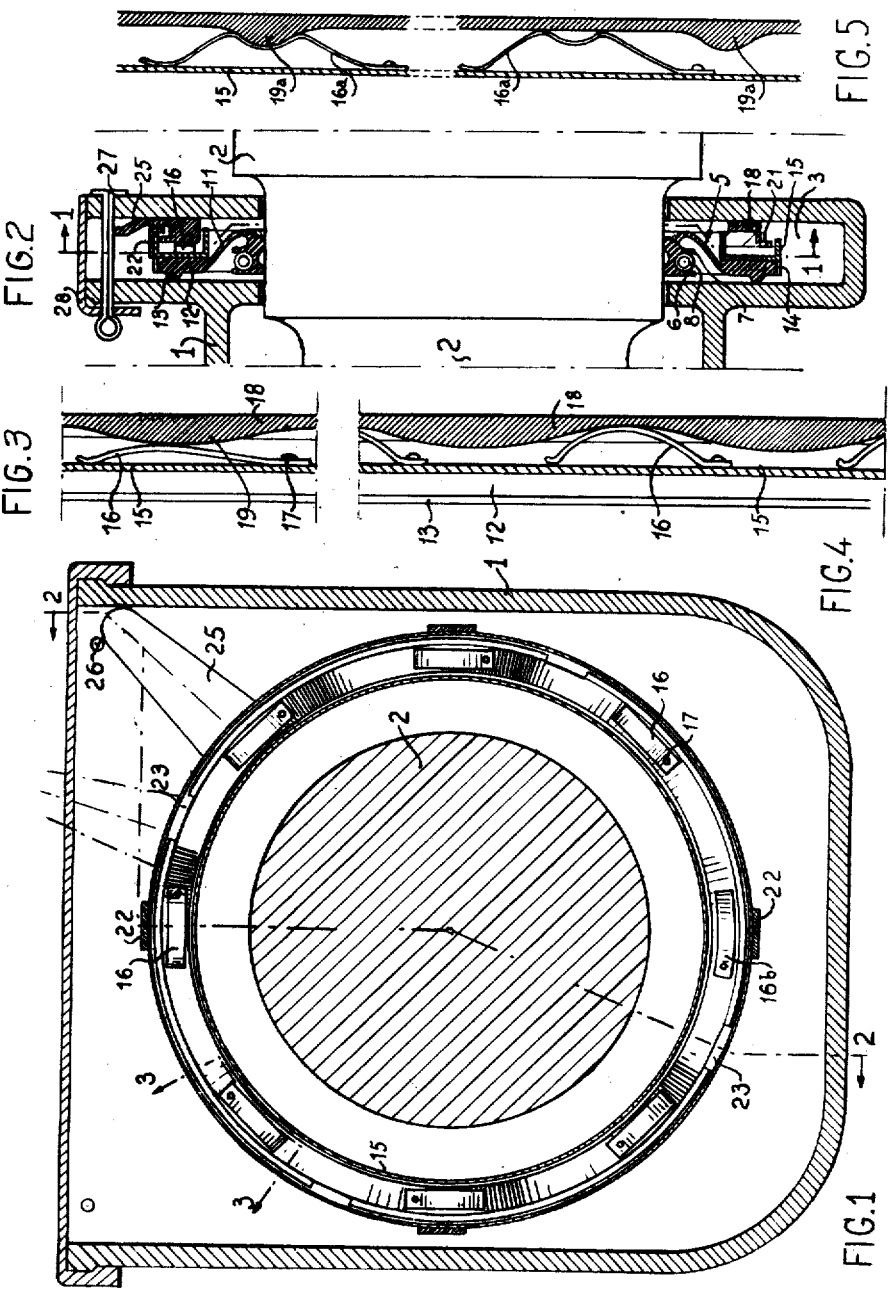

2,890,068

SEAL FOR AXLE BOXES

Gaston Georges Eugene Augereau, Paris, France

Application January 3, 1956, Serial No. 557,210

Claims priority, application France January 12, 1955

6 Claims. (Cl. 286—5)

The present invention relates to axle boxes for railway rolling stock and, more particularly, to seals for boxes of the type comprising a compartment or recess for accommodating said seals.

The purpose of such seals is to provide oil-tight engagement both with the rotary axle and with the inner face of the recess which is rigid with the box body and, therefore, stationary. In order to meet both these requirements, the seal has an annular lip in bearing engagement with the rotary axle and an annular flange in engagement with the recess wall, said lip and said flange being connected together by means of a flexible web portion.

The recess for accommodating the seals of such axle boxes are generally cored recesses and variations on their width are often to be found in spite of the care taken in casting. If trouble were taken to machine these recesses, the cost price of the boxes would be considerably higher and hardly any advantage derived therefrom because, in the course of maintenance, handling would soon bring these pieces under conditions hardly better than if they were left rough cast.

The main object of the invention is to provide an axle box seal which is easy to be set into place, removed, replaced and, if need be, repaired.

Such result is obtained, according to the invention, by applying the seal against the inner wall of the recess by means of resilient members which bear against the opposite face of the recess through the medium of cams which permit stressing said resilient members.

By virtue of this arrangement, any possible variation in the width of the recess is easily made-up by the resilient members under the action of the cams.

In a preferred embodiment, said resilient members are carried by a ring-member and the cams are carried by a further ring member, one of said ring members being adapted to bear against the outer wall of the recess, and the other against the annular flange of the seal which engages the inner wall of the recess.

Other objects and advantages of this invention will be apparent to those skilled in the art from a consideration of the following description of one embodiment shown by way of example, with reference to the accompanying drawings, in which:

Fig. 1 is a vertical section taken on the line 1—1 of Fig. 2, of an axle box of railway rolling stock comprising a device for clamping a seal according to the invention.

Fig. 2 is a longitudinal section of the box, taken substantially on the line 2—2 of Fig. 1.

Fig. 3 is a fragmentary section taken along the line 3—3 of Fig. 1, the springs being shown under stressed condition.

Fig. 4 is a section similar to that of Fig. 3, the springs being released; and

Fig. 5 shows a modification.

Referring first to Figs. 1 and 2, 1 is an axle box of a railway-car, the axle being indicated as at 2. According to well-known practice, said box is obtained by a casting process with a recess 3 open upwardly and adapted to accommodate the seal which prevents the oil contained in the box from leaking out along the axle 2. The present invention is concerned with the particular structure of an armature for clamping this seal in the box.

The seal proper, of known construction, is constituted by an annular synthetic rubber part 5 the particular cross-section of which is shown on Fig. 2. It comprises three portions, namely: an annular lip 6 adapted to provide a seal on the rotary axle, a wide annular flange 12 formed with an annular ridge 13 adapted to form a seal against the stationary body of the box, and, therebetween, a flexible portion or web 11 connecting both aforesaid portions together in an oil-tight manner, while allowing the axle to move relative to the oil box.

The armature for clamping this obturator against the body of the oil box comprises: a thin ring 15, U-shaped in cross-section, the bottom of which bears against the outer face of the flange 12, and a number (eight in the embodiment illustrated) of leaf springs 16 the convex configuration of which is visible on Fig. 3 on a larger scale.

In order to allow such springs to yield they are secured by one end thereof only, as by means of a rivet 17 for instance. The ring 15 may be centered on the seal flange by means of lugs 14 rigid with said ring. The convex face of the springs is engaged by an annular cam 18 having bosses 19 equal in number to the springs 16 and having its opposite face in bearing engagement against the outer wall of the recess 3 for the seal.

The annular cam 18 is retained within the ring 15 by an annular flange 21 and a number (four in the embodiment illustrated) of lugs 22 rigid with the ring 15. In order to permit the introduction of cam 18 into the ring 15 and take it thereout, a corresponding number of rectangular notches 23 are cut out in the flange 21 of the ring 15. It is, thus, possible to shift the cam 18 axially relative to the ring 15 when the notches 23 and lugs 22 are brought into register whereas, when the latter are not in register, the cam 18 and ring 15 cannot be taken apart.

Furthermore, for the correct positioning and clamping of the seal, cam 18 has a depending finger 25 which will be acted upon by a suitable lever. A sliding cover 28 serves for closing the top of the recess 3 and is locked by a split cotter 27 which also locks the finger 25 and, therefore, the cam 18 in operative position.

The operation of the seal that has just been described is the following:

In normal operating position shown in the drawing, the leaf springs 16 heavily apply the annular ridge 13 of the heel 12 of the seal against the face of the axle box 1, by bearing against the corresponding bosses 19 of the cam 18 which itself has its opposite face in bearing engagement against the adjacent wall of the recess 3. It will be seen that the oil contained in the box 1, therefore, is unable to leak out along the axle since it is stopped by the edges of the annular lip 6. It is also unable to leak along the outer or heel portion 12 of the seal, since the annular ridge 13 of this portion is resiliently and heavily applied by the springs 16 against the wall of the box. These springs are kept under stressed condition since the cam 18 is locked by the split cotter 27.

In order to dismount the seal when the axle box is not in place, the cover 28 is first removed, and the cam 18 is then rotated counter-clockwise (looking at Fig. 1), by means of the finger 25, thus moving the cam 18 away from the springs 16 (see Fig. 4). These springs are kept under released condition and the whole assembly of the seal and its armature may be taken out through the upper opening of the recess 3.

If need be, the two rings may be taken apart by first bringing the notches 23 in register with the lugs 22.

In a modification, the rings 15 and 18 are angularly locked one with respect to the other by means of undulated springs 16a (Fig. 5) which cooperate with the apices of the corresponding bosses 19a of the cam.

The springs may be made from blanks having a curvilinear outline corresponding to the curvature of the ring member as indicated at 16b by way of example at the bottom portion of Fig. 1.

In a general manner, while it has been, in the above description, disclosed what is deemed to be practical and efficient embodiments of the invention, it should be well understood that it is not wished to be limited thereto as there might be changes made in the arrangement, disposition and form of the parts without departing from the principle of the present invention.

What is claimed is:

1. In an axle box assembly of the type provided with a housing through which the axle extends, an axle sealing diaphragm located in the housing and having a rim portion for engaging one peripheral wall thereof, and an armature for the rim portion, the said armature comprising two mutually facing ring members adapted to be positioned in the housing for relative angular movement therein, a plurality of bowed leaf springs, each spring being secured at one end to the inner radial face of one of the ring members at angularly spaced points thereof, a plurality of cam portions equal to the number of leaf springs uniformly located on the inner radial face of the other of the ring members adapted to engage with the leaf springs, with the engagement being such that in an operative relative angular position of the ring members, the leaf springs are stressed by the corresponding cam portions and thus urge the ring members apart toward the opposite radial walls of the housing thereby to support frictionally the sealing diaphragm therebetween, while in the inoperative relative angular position of the ring members, the leaf springs are released so that the sealing diaphragm and the armature may be removed from or re-positioned in the housing.

2. The armature according to claim 1, wherein said ring member in bearing engagement against said rim portion of the sealing diaphragm is relatively thin and U-shaped in cross-section, said leaf springs being accommodated and the other ring member being received, at least partly, in said U-shaped cross-section.

3. The armature according to claim 2, wherein said other ring member has a peripheral flange and wherein said U-shaped ring member has lugs folded over said peripheral flange of said other ring member.

4. The armature according to claim 3, wherein said peripheral flange has notches through which said lugs of said U-shaped ring member may be passed in axial direction.

5. The armature according to claim 1, wherein said leaf springs have a curvilinear configuration mating with the curvature of said ring members.

6. The armature according to claim 1, wherein said leaf springs have a depressed portion adapted to be resiliently engaging by the apex of the corresponding cam portion in order to resiliently lock said ring members one with respect to the other.

References Cited in the file of this patent

UNITED STATES PATENTS

| | | |
|---|---|---|
| 594,298 | Surth | Nov. 23, 1897 |
| 2,177,606 | Bigelow | Oct. 24, 1939 |
| 2,657,080 | Johnson et al. | Oct. 27, 1953 |
| 2,688,503 | Hennessy | Sept. 7, 1954 |